United States Patent
Gou et al.

(10) Patent No.: US 11,077,598 B2
(45) Date of Patent: Aug. 3, 2021

(54) ENERGY TRANSFER SCREW AND IMPROVED EXTRUSION PROCESS

(71) Applicant: Dow Global Technologies LLC, Midland, MI (US)

(72) Inventors: Qian Gou, Collegeville, PA (US); Mark A. Spalding, Midland, MI (US); Bharat I. Chaudhary, Collegeville, PA (US); Karl Seven, Collegeville, PA (US)

(73) Assignee: Dow Global Technologies LLC, Midland, MI (US)

(*) Notice: Subject to any disclaimer, the term of this patent is extended or adjusted under 35 U.S.C. 154(b) by 273 days.

(21) Appl. No.: 16/344,691

(22) PCT Filed: Oct. 13, 2017

(86) PCT No.: PCT/US2017/056573
§ 371 (c)(1),
(2) Date: Apr. 24, 2019

(87) PCT Pub. No.: WO2018/080806
PCT Pub. Date: May 3, 2018

(65) Prior Publication Data
US 2020/0047387 A1 Feb. 13, 2020

Related U.S. Application Data

(60) Provisional application No. 62/414,098, filed on Oct. 28, 2016.

(51) Int. Cl.
*B29C 48/53* (2019.01)
*C08F 10/02* (2006.01)
(Continued)

(52) U.S. Cl.
CPC .............. *B29C 48/53* (2019.02); *B29C 48/66* (2019.02); *C08F 10/02* (2013.01); *C08J 3/247* (2013.01);
(Continued)

(58) Field of Classification Search
CPC ...... B29C 48/53; C08F 10/02; C08F 2810/20; C08J 3/247
See application file for complete search history.

(56) References Cited

U.S. PATENT DOCUMENTS 3,445,890 A * 5/1969 Heston .................... B29C 48/64
425/209
3,650,652 A * 3/1972 Dray ..................... B29C 48/505
425/206

(Continued)

FOREIGN PATENT DOCUMENTS

DE 10253225 A1 6/2004

OTHER PUBLICATIONS

Somers, An Experimental Study of the Flows in an Energy Transfer Screw, https://www.robertbarr.com/pdfs/flow-study-of-et-screw.pdf, 2002, p. 1-5. (Year: 2002).*

*Primary Examiner* — Robert C Boyle
(74) *Attorney, Agent, or Firm* — Quarles & Brady LLP

(57) ABSTRACT

Lower discharge temperatures and improved flow rates are obtained for the processing of meltable, solid crosslinkable compositions comprising a polymer, e.g., polyethylene, and a peroxide, in a single barrel extruder by equipping the extruder with an energy transfer (ET) screw that comprises: (1) an ET section with a distance averaged ET section depth of 8.0% to 10% of the extruder barrel internal diameter, and (2) a metering section with a metering section depth of 6.0% to 8% of the extruder barrel internal diameter.

8 Claims, 4 Drawing Sheets

(51) Int. Cl.
*C08J 3/24* (2006.01)
*B29C 48/66* (2019.01)
*B29C 48/25* (2019.01)
*B29C 48/505* (2019.01)

(52) U.S. Cl.
CPC ........ *B29C 48/2513* (2019.02); *B29C 48/507* (2019.02); *B29K 2023/04* (2013.01); *C08F 2810/20* (2013.01)

(56) References Cited

U.S. PATENT DOCUMENTS

| | | | |
|---|---|---|---|
| 4,173,417 A * | 11/1979 | Kruder | B29C 48/65 366/89 |
| 4,310,484 A * | 1/1982 | Blakeslee, III | B29C 48/022 264/211.21 |
| 4,405,239 A * | 9/1983 | Chung | B29C 48/65 366/89 |
| 5,272,236 A | 12/1993 | Lai et al. | |
| 5,278,272 A | 1/1994 | Lai et al. | |
| 5,986,028 A | 11/1999 | Lai et al. | |
| 6,176,606 B1 | 1/2001 | Thompson et al. | |
| 6,599,004 B2 * | 7/2003 | Barr | B29C 48/52 366/88 |
| 7,355,089 B2 | 4/2008 | Chang et al. | |
| 9,156,201 B2 | 10/2015 | Schneider et al. | |
| 2004/0141406 A1 | 7/2004 | Womer et al. | |
| 2011/0217406 A1 | 9/2011 | Chung et al. | |

* cited by examiner

ENERGY TRANSFER SCREW AND IMPROVED EXTRUSION PROCESS

FIELD OF THE INVENTION

This invention relates to the extrusion of plastic materials. In one aspect, the invention relates to an energy transfer screw while in another aspect, the invention relates to an extrusion process using the energy transfer screw.

BACKGROUND

Extruders and the process of extruding plastic materials using an extruder are well known in the art. U.S. Pat. No. 4,405,239 teaches a single screw extruder which houses the screw rotatably in a cylindrical barrel for plasticating or melting solid plastic material. The screw has a feed end and a discharge end, and embodies a novel mixing section between the feed end and discharge end.

U.S. Pat. No. 6,599,004 teaches an extruder screw that includes an energy transfer section divided into successive barrier sections in which a channel formed by a first thread is divided into at least two subchannels by a second thread. A ratio of the difference in outer diameters of the threads is approximately inversely proportional to the ratio of the lengths of adjacent ones of the barrier sections.

U.S. Pat. No. 9,156,201 teaches a single screw extruder comprising a cylinder which comprises a transition zone and a homogenizing zone that is connected to the transition zone, and a screw which is rotatably supported in the cylinder and which has at least two consecutive displacement parts in the homogenizing zone, the second displacement part of which in the conveying direction is designed as a shearing part.

The conventional energy transfer screw design generally provides an improved flow rate and lower discharge temperatures for plastic materials as compared to non-energy transfer screw designs. However, even this design experiences increased discharge temperatures when the flow rate is increased. This, of course, presents a problem in peroxide-containing compositions (such as those used to make power cables) because high temperatures can activate the peroxide resulting in scorch.

Power cables used in electrical distribution and transmission applications are classified by the International Electrotechnical Commission as low-voltage (less than 1 kV), medium-voltage (1 kV up to 30 kV), high-voltage (above 30 kV up to 150 kV) and extra high-voltage (above 150 kV). The medium- to extra high-voltage cable cores are made by triple extrusion processes in which conductors are coated with peroxide-containing polyolefin compositions designed for the following layers: semiconductive conductor shield, electrical insulation (the thickest polymer layer) and semiconductive insulation shield. Extrusion of the polymer compounds is typically done at temperatures below 140° C. (preferably 135° C. or less), to prevent premature crosslinking ("scorch"), and the coated conductor subsequently passes through a continuous vulcanization tube operating at temperatures up to about 300° C. where the peroxide is completely decomposed to enable crosslinking of the polymers. The insulation thickness increases with voltage class, for instance, ranging from 5 mm (for 69 kV cables) to 27 mm (for 400 kV cables).

SUMMARY OF THE INVENTION

In one embodiment the invention is an energy transfer (ET) screw for a single screw extruder, the extruder comprising an extruder barrel with an inside diameter, the screw comprising:
(1) an ET section with a distance averaged ET section depth of 8.0% to 10.0% of the extruder barrel internal diameter, and
(2) a metering section with a metering section depth of 6.0% to 8.0% of the extruder barrel internal diameter.

In one embodiment the extruder comprises a plurality of barrier clearances that are the same throughout the length of the energy transfer section. In one embodiment the extruder comprises a plurality of barrier clearances that reduce throughout the length of the energy transfer section.

In one embodiment the invention is a process of melting and extruding a crosslinkable composition in a single screw extruder, the extruder comprising an energy transfer (ET) screw and a barrel with an inside diameter, the screw rotatably mounted within the barrel, the process comprising the steps of:
(A) feeding a meltable, solid crosslinkable composition to the extruder;
(B) rotating the screw within the extruder barrel; and
(C) melting the solid crosslinkable composition within the extruder as the composition moves through the extruder by the rotation of the screw; the screw comprising:
(1) an ET section with a distance averaged ET section depth of 8.0% to 10.0% of the extruder barrel internal diameter, and
(2) a metering section with a metering section depth of 6.0% to 8.0% of the extruder barrel internal diameter.

In one embodiment the crosslinkable composition comprises a free radical initiator. In one embodiment the free radical initiator is a peroxide.

DETAILED DESCRIPTION

Definitions

Figure 1:
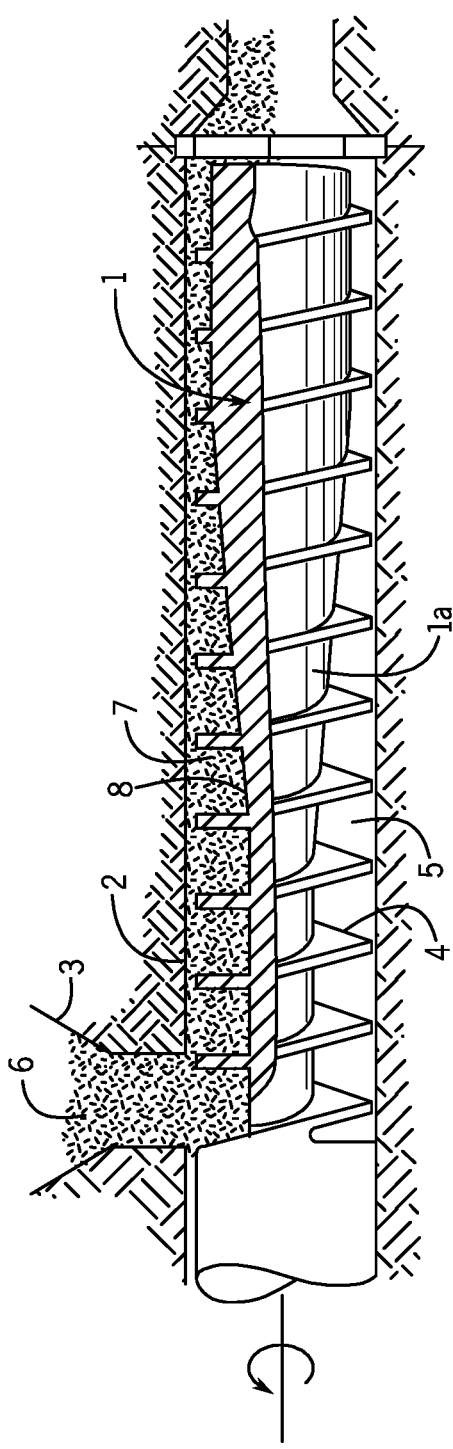
FIG. 1 is a fragmentary schematic view of the screw structure shown in FIG. 1 of U.S. Pat. No. 4,405,239.

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure), the description of screws, and the general knowledge in the art.

The numerical ranges disclosed herein include all values from, and including, the lower and upper value. For ranges containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

Unless stated to the contrary, implicit from the context, or customary in the art, all parts and percents are based on weight and all test methods are current as of the filing date of this disclosure.

"Ethylene-based polymer" and like terms refer to a polymer containing, in polymerized form, a majority weight percent of units derived from ethylene based on the total weight of the polymer. Nonlimiting examples of ethylene-based polymers include low density polyethylene (LDPE), linear low density polyethylene (LLDPE), very low density polyethylene (VLDPE), ultra-low density polyethylene (ULDPE), medium density polyethylene (MDPE), high density polyethylene (HDPE), and functionalized polyethylene, e.g., ethylene vinyl acetate (EVA), ethylene ethyl acrylate (EEA), and the like.

"Meltable" and like terms mean, as used to describe a polymeric composition, that the composition can be changed from a solid to a viscous liquid through the application of heat and/or the shear forces resulting from mechanical mixing. In the context of extrusion, a meltable composition is a composition that, if fed to the extruder as a solid, will change to and exit from the extruder as a viscous liquid due to the heat and shear forces to which the composition is subjected as it moves through the extruder from the feed section to the metering section.

"Crosslinkable" and like terms mean, as used to describe a polymeric composition, that the composition is not crosslinked and it has not been subjected or exposed to treatment that has induced substantial crosslinking notwithstanding that the composition comprises additive(s) or functionality which will cause, promote or enable substantial crosslinking upon subjection or exposure to such treatment (e.g., exposure to an activated free radical initiator, e.g., a peroxide).

"Crosslinked" and like terms mean, as used to describe a polymeric composition, that the composition has been subjected or exposed to a treatment which induced crosslinking (e.g., has been exposed to an activated free radical initiator, e.g., a peroxide).

"Viscous" and like terms mean, as used to describe a polymeric composition, that the composition exhibits a thick fluid flow, as opposed to a watery fluid flow. The polymeric compositions used in the practice of this invention exit the extruder with sufficient viscosity such that it can be shaped into various structures, e.g., film, molded parts, etc.

"Distance averaged ET section depth" and like terms mean the ratio of the total channel depth over the energy transfer section to the total channel length of the energy transfer section.

"Metering section depth" and like terms mean the metering channel depth over the length of the metering section.

Energy Transfer (ET) Screw

Figure 2:
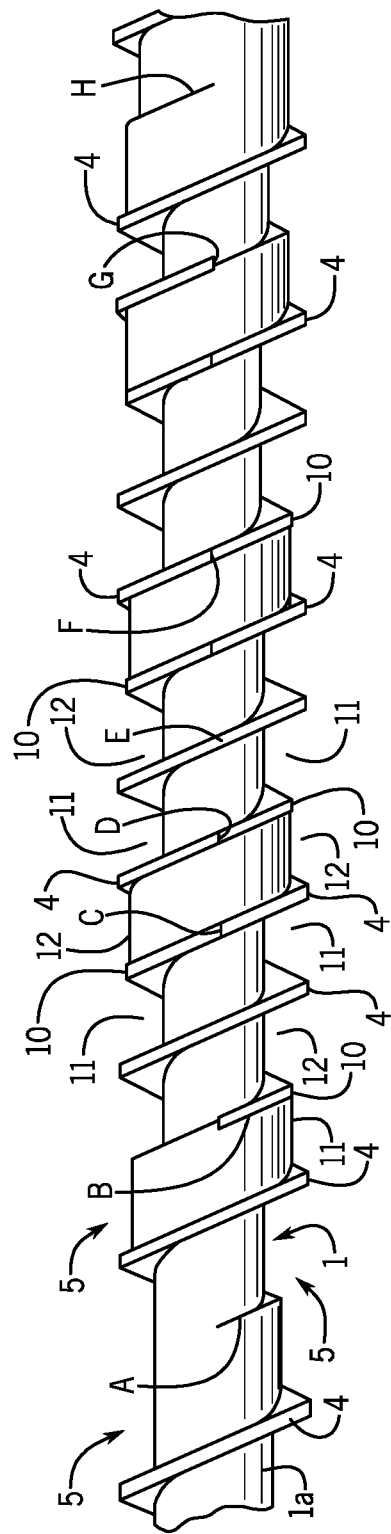
FIG. 2 is a fragmentary schematic view of the screw structure shown in FIG. 2 of U.S. Pat. No. 4,405,239.

FIG. 1 is a fragmentary schematic view of the screw structure shown in FIG. 1 of U.S. Pat. No. 4,405,239. FIG. 2 is a fragmentary schematic view of the screw structure shown in FIG. 2 of U.S. Pat. No. 4,405,239. In one embodiment, the ET screw of this invention is a modification of the ET screw described in FIG. 2 of U.S. Pat. No. 4,405,239.

In FIG. 1, a single screw extruder includes a screw 1 rotatably mounted inside a cylindrical barrel 2 and a hopper 3 mounted in an opening of barrel 2 at the feed end of the extruder. Screw 1 has at least one helical thread 4 with a minimum clearance to barrel 2 integrally mounted or formed on its core 1a. Thread 4 creates a helical channel 5 radially extending around core 1a of screw 1. The number of turns of thread 4 around core 1a will be called, hereinafter, "turns" for brevity. The axial distance between one turn of thread 4 is called "pitch". The depth of channel 5, the turns of thread 4, the pitch and width of thread 4 along screw 1 can vary, and their actual values along screw 1, constant and varying, will vary with the particular requirements and desires of the users of screw 1.

A solid plastic material 6, or a mixture of materials, in pellets, chip, powder or flake form is fed into channel 5 through hopper 3. Solid plastic material 6 in channel 5 is compacted into a solid plug or solid bed 7 as it travels down channel 5 by forces exerted by the rotation of screw 1. Solid bed 7 melts, primarily in contact with heated barrel 2, as it travels down channel 5 and the molten plastic material is collected by the wiping action of advancing thread 4 into melt pool 8. Melt pool 8 gradually increases long channel 5 as solid bed 7 gradually melts, eventually occupying the entire channel 5 toward the discharge end.

Efficient mixing of the solid and molten plastic are accomplished by the structural features of screw 1 for breaking up solid bed 7 into small pieces and mixing the small pieces of solid bed 7 into melt pool 8 by the natural forces exerted by the rotation of screw 1.

In FIG. 2A represents a position along screw 1 located at about one third to two thirds of the length of screw 1 through hopper 3, where channel 5 contains about 5 to 50% solid plastic material with the rest being molten plastic material. At A, one half of channel 5 toward the feed end, to be called front half channel hereinafter, starts to gradually decrease its depth while the other half of channel 5 toward the discharge end, to be called back half channel hereinafter, starts to gradually increase its depth. At B which is located about one half to one turn toward the discharge end from A, the front half channel attains its minimum depth which is comparable to or greater than the size of the individual components of the solid plastic material but not less than about 0.030 inch while the back half channel attains its maximum depth which is comparable to or less than the depth of channel 5 under hopper 3. Such a structural feature between A and B causes substantially the entire amount of solid bed 7 present at A as well as a major portion of melt pool 8 to go into the back half channel at B and allows predominately molten plastic material to pass through the front half channel at B.

A second thread 10, which is substantially parallel to thread 4 and has a large clearance to barrel 2 comparable to but not less than the depth of the front half channel at B, originates at B rising from the floor of channel 5 and divides channel 5 into two sub-channels, a front sub-channel 11 which corresponds to the front half channel and a back sub-channel 12 which corresponds to the back half channel. The width of the second thread 10 may be the same as or different from that of thread 4. It is also possible, although not preferable, to originate the second thread 10 at A. The depth of front sub-channel 11 gradually increases starting at B, reaching maximum at C which is located at about one half to one turn toward the discharge end from B while the depth of back sub-channel 12 decreases starting at B, reaching minimum at C. The depth of front sub-channel 11 at C is comparable to or less than the depth of channel 5 under hopper 3, and it may be the same as or different from the depth of the back half channel at B. The depth of back sub-channel 12 at C is comparable to or greater than the size of the individual components of the solid plastic material but not less than about 0.030 inch, and it may be the same as or different from the depth of the front half channel at B. The nature of the gradual increase and decrease on channel depth may be linear, cyclical or any other type as long as the change is gradual. The clearance of the second thread 10 may be kept constant or gradually varied between B and C.

The combined cross-sectional area of front sub-channel 11 and back sub-channel 12 across second thread 10 may be kept constant or deliberately altered along the helical passage from B to C in order to cause random flow patterns of the plastic material for better mixing. Such structural feature between B and C causes by the forces exerted by the rotation of screw 1, a majority of the plastic material, both solid and molten, to move from back sub-channel 12 into front sub-channel 11 flowing over the second thread 10. Solid bed 7, while moving from back sub-channel 12 into front sub-channel 11 over second thread 10, will be broken up into small pieces and mixed with the molten plastic material thereby greatly increasing heat transfer from the molten plastic material to solid plastic material. The amount of shearing work exerted by second thread 10 to the plastic material depends on the width and especially clearance of second thread 10.

Second thread 10 converts to become thread 4 at C while thread 4 converts to become second thread 10 at D which is located on thread 4 substantially across C toward the discharge end. The maximum depth of front sub-channel 11 is maintained between C and E which is located at about one half to preferably one turn toward the discharge end from C. The unique conversions of the threads at C and D together with the structural features between C and E make the geometries of screw 1 at D substantially the same as those at B. The structural features between B and D are repeated between D and F in substantially the same way, causing a major portion of the plastic material, both solid and molten, collected in front sub-channel 11 to move back into back sub-channel 12 again by the forces exerted by the rotation of screw 1. The movement of the plastic material to the opposite direction of the natural movement requires a high pressure buildup in the delivery sub-channel, and the high pressure can cause undesirable heat buildup and reduction in the pumping capacity of screw 1. The structural features between B and D may be repeated in substantially the same was as many times as desired between F and G. The depths of front sub-channel 11 and back sub-channel 12 and the clearance of second thread 10 may be made different from those used between B and D in each repeat cycle in order to achieve the optimum mixing and melting functions of screw 1. Second thread 10 terminates at G, and front sub-channel 11 and back sub-channel 12 merge to become a single channel by gradually changing their depths to a common depth at H which is located about one half to one turn toward the discharge end from G. Second thread 10 may be present between G and H, terminating at H. The depth of channel 5 usually is kept constant from H to the end of screw 1.

As described by the inventor of the extruder screw claimed in U.S. Pat. No. 6,599,004, and who is also a coinventor of the extruder screw claimed in U.S. Pat. No. 4,405,239, FIGS. 2 and 3 of U.S. Pat. No. '239 shows a transfer section located between the end of taper section A and the beginning of section H, and a metering section located from the beginning of section H to the end of screw 1. The energy transfer section has a barrier thread that creates a sub-channel within the screw channel. The screw allows the solids particles and the melt pool to flow in a single direction by alternating which thread is used as the wiping thread—the thread with the minimum barrel clearance that moved the material towards the feed end. The depth of each of the sub-channels is varied as in the prior art so as to promote the flow of materials from one sub-channel to the other. This depth variation occurs throughout the length of the sub-channels. As the depth in one sub-channel increases, the other decreases—a pattern that is repeated throughout the length of the screw's energy transfer section. In addition, the clearances of the threads are interrupted in relation to the variation in sub-channel depth to increase the back flow noted above. At the point where the depth of the channels is reversed, the threads diameters are also reversed, such that the wiping thread's clearance is reduced so that the wiping thread becomes the barrier thread, and the barrier thread's clearance is increased so that the barrier thread becomes the wiping thread. The point at which the threads reverse or convert is the beginning of a barrier section. The thread clearances do not vary in the undulating manner of the sub-channel depth. Instead, there is a quick drop-off from the minimum barrel clearance of the wiping thread to the lesser clearance of the barrier thread, or vice versa. Farther downstream another reversal takes place, defining another barrier section, and the threads resume their original functions. These thread reversals or conversions take place throughout the length of the energy transfer section.

The U.S. Pat. No. '239 also discloses barrier sections that are identical both in length and barrier clearance, that is, the clearance between the wiping thread and the barrier thread is constant throughout the screw's energy transfer section such that the size of the particles that could pass between the sub-channels is constant throughout the length of the screw's energy transfer section. Constant length and clearance sections have inherent limitations in promoting conductive melting because while mixing is promoted, constant clearances and lengths allow the same size material to pass regardless of its location in the energy transfer section. The refining or dispersion of the melt can be improved by varying the length and clearance of the energy transfer sections so as to only allow smaller and smaller particles to move down the length of the screw which, at one level, is accomplished by the design of the extruder screw of U.S. Pat. No. '004.

In one embodiment, the ET screw of this invention is a modification of the ET screw described in FIGS. 2 of U.S. Pat. No. 6,599,004. A principal difference between the ET screw of FIG. 2 of U.S. Pat. No. 4,405,239 and the ET screw of FIG. 2 of U.S. Pat. No. 6,599,004 is the barrier clearances throughout the length of the energy transfer section. In the screw of U.S. Pat. No. 4,405,239 the barrier clearances are essentially constant throughout the length of the energy transfer section, while in the screw of U.S. Pat. No. 6,599,004 the barrier clearances gradually reduce throughout the length of the energy transfer section.

In one embodiment the ET screw of this invention is the ET screw described in FIG. 2 of U.S. Pat. No. '239 in which the ET section has a (1) distance averaged ET section depth of 8.0% to 10.0% of the extruder barrel internal diameter, and (2) a metering section depth of 6.0% to 8.0% of the extruder barrel internal diameter. In one embodiment the ET screw of this invention is the ET screw described in FIG. 2 of U.S. Pat. No. '004 in which the ET section has a (1) distance averaged ET section depth of 8.0% to 10.0% of the extruder barrel internal diameter, and (2) a metering section depth of 6.0% to 8.0% of the extruder barrel internal diameter. These depths allow the ET screw to process meltable, solid crosslinkable compositions at a lower discharge temperature and at a significant rate improvement relative to an ET screw similar in all aspects other than the distance averaged ET section depth and the metering section depth.

Meltable, Solid Crosslinkable Composition

The compositions that can be used in the practice of this invention are meltable, crosslinkable polymeric solids. The shape of the solids can vary to convenience and include, but are not limited to, pellets, granules, powders and flakes. The size of the solids can also vary to convenience, and typically ranges from 0.5 millimeters (mm) to 5 mm.

Although the meltable, solid crosslinkable compositions that can be used in the practice of this invention can comprise any crosslinkable polymer, the ET screw of this invention is particularly useful in processing polyolefins, especially ethylene-based polyolefins. Polyolefin polymers include both polyolefin homopolymers and interpolymers. Examples of polyolefin homopolymers are the homopolymers of ethylene and propylene. Examples of the polyolefin interpolymers are the ethylene/α-interpolymers and the propylene/α-olefin interpolymers. The α-olefin is preferably a $C_{3-20}$ linear, branched or cyclic α-olefin (for the propylene/α-olefin interpolymers, ethylene is considered an α-olefin). Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the α-olefins described above. Similarly, styrene and its related olefins (for example, α-methylstyrene, etc.) are α-olefins for purposes of this invention. Illustrative polyolefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, and ethylene/butene/styrene. The copolymers can be random or blocky.

The polyolefin can also comprise one or more functional groups such as an unsaturated ester or acid, and these polyolefins are well known and can be prepared by conventional high-pressure techniques. The unsaturated esters can be alkyl acrylates, alkyl methacrylates, or vinyl carboxylates. The alkyl groups can have 1 to 8 carbon atoms and preferably have 1 to 4 carbon atoms. The carboxylate groups can have 2 to 8 carbon atoms and preferably have 2 to 5 carbon atoms. The portion of the copolymer attributed to the ester comonomer can be in the range of 1 up to 50 percent by weight based on the weight of the copolymer. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. Examples of the unsaturated acids include acrylic acids or maleic acids.

More specific examples of polyolefins useful in the practice of this invention include, but are not limited to, very low density polyethylene (VLDPE) (e.g., FLEXOMER™ ethylene/1-hexene polyethylene made by The Dow Chemical Company), homogeneously branched, linear ethylene/.alpha.-olefin copolymers (e.g. TAFMER™ by Mitsui Petrochemicals Company Limited and EXACT™ by Exxon Chemical Company), homogeneously branched, substantially linear ethylene/.alpha.-olefin polymers (e.g., AFFINITY™ and ENGAGE™ polyethylene available from The Dow Chemical Company), and olefin block copolymers such as those described in U.S. Pat. No. 7,355,089 (e.g., INFUSE™ available from The Dow Chemical Company). Polyolefins particularly useful in the practice of this invention are the homogeneously branched linear and substantially linear ethylene copolymers. The substantially linear ethylene copolymers are more fully described in U.S. Pat. Nos. 5,272,236, 5,278,272 and 5,986,028.

The polyolefins useful in the practice of this invention also include propylene, butene and other alkene-based copolymers, e.g., copolymers comprising a majority of units derived from propylene and a minority of units derived from another α-olefin (including ethylene). Exemplary propylene polymers useful in the practice of this invention include the VERSIFY™ polymers available from The Dow Chemical Company, and the VISTAMAXX™ polymers available from ExxonMobil Chemical Company.

In one embodiment the meltable, solid crosslinkable composition comprises a free radical initiator. Suitable free radical initiators include, but are not limited to, the dialkyl peroxides and diperoxyketal initiators. These compounds are described in the Encyclopedia of Chemical Technology, $3^{rd}$ edition, Vol. 17, pp. 27-90 (1982). Mixtures of two or more free radical initiators may also be used together as the free radical initiator. In addition, free radicals can form from shear energy, heat or radiation.

In the group of dialkyl peroxides, nonlimiting examples of suitable free radical initiators are: dicumyl peroxide, di-t-butyl peroxide, t-butyl cumyl peroxide, 2,5-dimethyl-2,5-di(t-butylperoxy)-hexane, 2,5-dimethyl-2,5-di(t-amylperoxy)-hexane, 2,5-dimethyl-2,5-di(t-butylperoxy)hexyne-3, 2,5-dimethyl-2,5-di(t-amylperoxy)hexyne-3, α,α-di [(t-butylperoxy)-isopropyl]-benzene, di-t-amyl peroxide, 1,3,5-tri-[(t-butylperoxy)-isopropyl]benzene, 1,3-dimethyl-3-(t-butylperoxy)butanol, 1,3-dimethyl-3-(t-amylperoxy) butanol and mixtures of two or more of these initiators.

In the group of diperoxyketal initiators, nonlimiting examples of suitable free radical initiators include: 1,1-di(t-butylperoxy)-3,3,5-trimethylcyclohexane, 1,1-di(t-butylperoxy)cyclohexane n-butyl, 4,4-di(t-amylperoxy)valerate, ethyl 3,3-di(t-butylperoxy)butyrate, 2,2-di(t-amylperoxy) propane, 3,6,6,9,9-pentamethyl-3-ethoxycarbonylmethyl-1,2,4,5-tetraoxacyclononane, n-butyl-4,4-bis(t-butylperoxy)-valerate, ethyl-3,3-di(t-amylperoxy)-butyrate and mixtures of two or more of these initiators.

The amount of free radical initiator present in the composition can vary with the minimum amount being sufficient to afford the desired range of crosslinking. The minimum amount of free radical initiator is typically at least 0.02 wt %, or at least 0.05 wt %, or at least 0.1, wt % based upon the weight of the crosslinkable polymer(s). The maximum amount of free radical initiator in the composition can vary, and it is typically determined by such factors as cost, efficiency and degree of desired crosslinking. The maximum amount is typically less than 20 wt %, or less than 15 wt %, or less than 10 wt % based upon the weight of the crosslinkable polymer(s).

The compositions used in the practice of this invention can, optionally, also contain additives and/or fillers. Representative additives include, but are not limited to, antioxidants, processing aids, colorants, ultraviolet stabilizers (including UV absorbers), antistatic agents, nucleating agents, slip agents, plasticizers, lubricants, viscosity control agents, tackifiers, anti-blocking agents, surfactants, extender oils, acid scavengers, and metal deactivators. These additives are typically used in a conventional manner and in conventional amounts, e.g., from 0.01 wt % or less to 10 wt % or more, based on the total weight of the composition. Fillers may be used in amounts greater than 10 wt %.

Process of Melting and Extruding

The ET screw of this invention is used in the same manner and with the same equipment as the known ET screws. The ET screw of this invention is designed for and fitted within a single barrel extruder, and the extruder is operated in known ways and under known conditions. The meltable, solid crosslinkable composition is fed into the feed section of the extruder, subjected to heat and the shear forces generated by the rotation of the screw acting on the composition as it moves through the extruder, and eventually discharged from the extruder as a viscous liquid. Heat is typically applied to the composition conductively through the extruder barrel wall from an external heat source, e.g., a heat jacket. The conditions of operation will vary with the composition, and these conditions are typically such that the composition will not experience any significant crosslinking until shortly before it begins to the exit the extruder.

The invention is further described through the following nonlimiting examples.

Specific Embodiments

Test Methods

Density is measured in accordance with ASTM D792, Method B. The result is recorded in grams (g) per cubic centimeter (g/cc or g/cm$^3$).

Melt index (MI) measurement for polyethylene is performed according to ASTM D1238, Condition 190° C./2.16 kilogram (kg) weight, formerly known as "Condition E" and also known as $I_2$, and is reported in grams eluted per 10 minutes.

For the propylene-based polymers melt flow rate (MFR) measurement is performed according to ASTM D1238, Condition 230° C./2.16 kilogram (kg) weight and is reported in grams eluted per 10 minutes.

Materials

DFDA-1216 NT LDPE is a low density polyethylene with a density of 0.92 g/cc and a melt index of 2.3 g/10 min and is available from The Dow Chemical Company.

ENGAGE™ 8200 polyolefin elastomer is an ethylene-octene copolymer with a density of 0.870 g/cc and a melt index of 5 g/10 min and is available from The Dow Chemical Company.

POE1 is an ethylene/1-octene polyolefin elastomer having a melt index ($I_2$) of 4.8 g/10 min., and a density of 0.872 g/cm$^3$, which is prepared by The Dow Chemical Company, Midland, Mich., USA.

POE2 is an ethylene/1-octene polyolefin elastomer having a melt index ($I_2$) of 3.0 g/10 min., and a density of 0.875 g/cm$^3$, which is prepared by The Dow Chemical Company, Midland, Mich., USA.

LDPE 6621 is a low density polyethylene with a density of 0.919 g/cc and a melt index of 0.47 g/10 min and is available from The Dow Chemical Company.

BRASKEM FF018F is a homopolymer polypropylene (PP) with a melt flow of 1.8 g/10 min and is available from Braskem USA.

NORDEL™ 3722 EL is an ethylene-propylene-diene rubber with a density of 0.870 g/cc and a Mooney viscosity at 125° C. of 18 MU and is available from The Dow Chemical Company.

High LCB EO Elastomer is a long chain branched ethylene-octene copolymer (Sample S3 from Dow case number 78288 and 78287) with density of 0.888 g/cc and melt index of 1.7 g/10 min.

High LCB EP Elastomer is a long chain branched ethylene-propylene copolymer (Sample S2 from Dow case number 78288 and 78287) with density of 0.890 g/cc and melt index of 1.5 g/10 min.

Two resin systems are used in Examples 1-3. The first resin is DFDA-1216 NT LDPE. The second resin system is a blend of 91 wt % ENGAGE™ 8200 and 9 wt % PP or 91 wt % POE1 and 9 wt % PP. These blends were made by blending at temperatures well above the melting points of both polymers. These blend compositions are referred to as ENGAGE-PP resin (if made with ENGAGE™ 8200 resin) or POE1-PP resin (if made with POE1). The ENGAGE-PP blend or POE1-PP blends are obtained using a COPERION™ W&P ZSK-30 mm co-rotating, intermeshing twin screw extruder with underwater pelletizer. For the ENGAGE-PP blend, the ZSK-30 mm was run at 13.6 kg/hr feed rate, 122 to 124 rpm screw speed, 20/325/200/100/20 mesh screens, and 140° C./140° C./150° C./165° C./165° C./176.67° C. set temperatures for 5 barrel zones and the die. For the POE1-PP blend, the ZSK-30 mm was run at 11.3 kg/hr feed rate, 175 rpm screw speed, 20/325/200/100/20 mesh screens and 140° C./140° C./150° C./165° C./135° C./93.3° C. set temperatures for 5 barrel zones and the die. In both cases, nitrogen purge at barrel #1 was set at 0.42 Nm³/hr.

Figure 3:
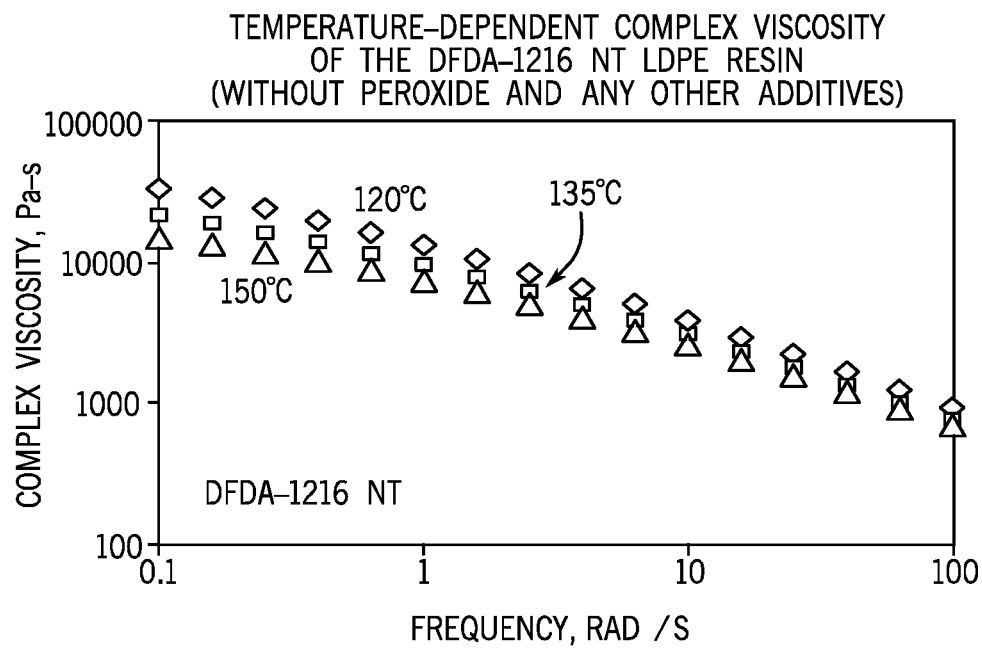
FIG. 3 is a graph reporting the temperature-dependent complex viscosity of DFDA-1216 NT LDPE resin (without peroxide and any other additives).
Figure 4:
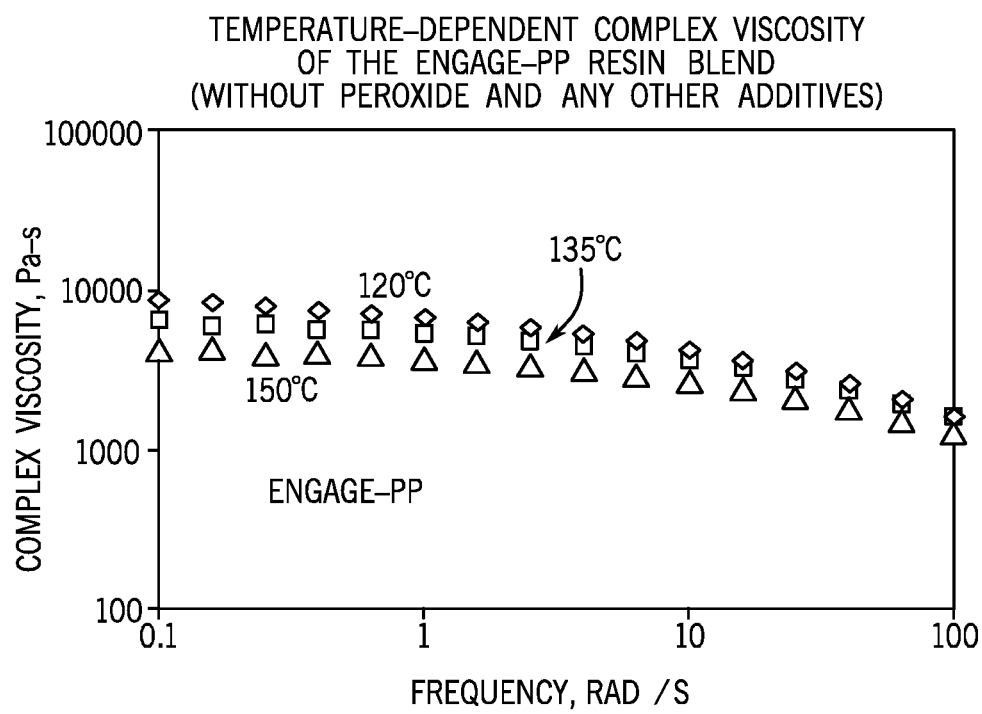
FIG. 4 is a graph reporting the temperature-dependent complex viscosity of the ENGAGE-PP resin blend (without peroxide and any other additives). (91.0 wt % ENGAGE™ 8200 resin, 9.0 wt % Braskem FF018F PP).
Figure 5:
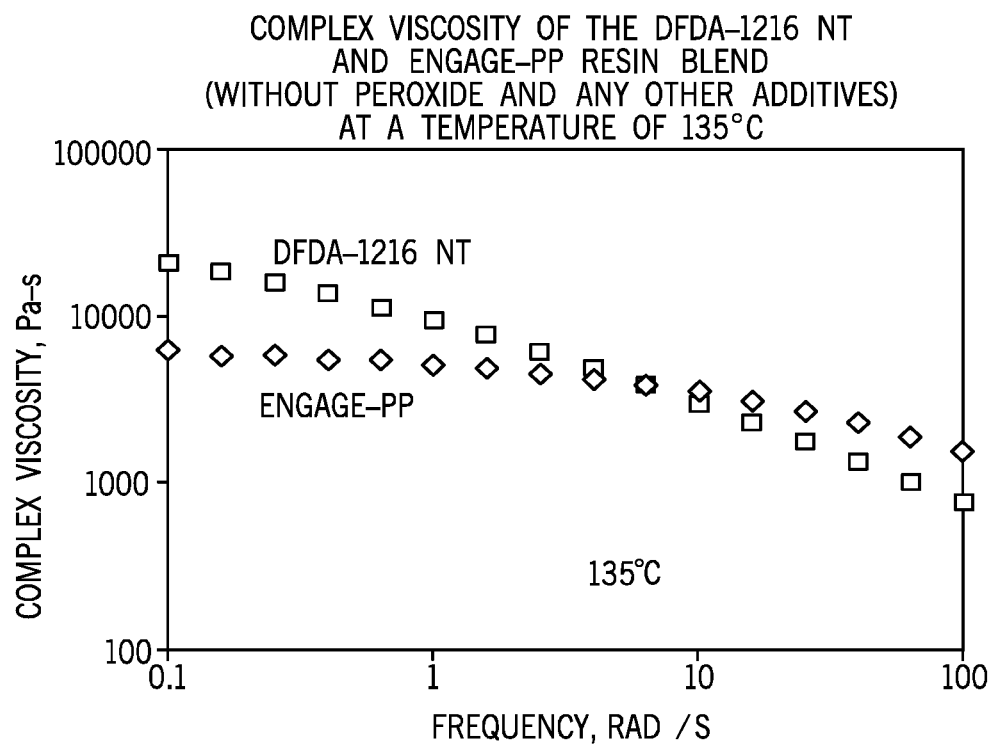
FIG. 5 is a graph reporting the complex viscosity of the DFDA-1216 NT and ENGAGE-PP resin blend (without peroxide and any other additives) at a temperature of 135° C. (91.0 wt % ENGAGE™ 8200 resin, 9.0 wt % Braskem FF018F PP).

The temperature-dependent complex viscosities of these resin systems are provided in FIGS. 3 and 4 (blue diamond is 120° C.; red square is 135° C.; and green triangle is 150° C.). FIG. 5 shows the complex viscosity of the resin systems at 135° C. (red square is DFDA-1216 NT; blue diamond is ENGAGE™-PP).

Example 1 (Comparative Example): Performance Data for Double Flighted Maddock Screw on Davis-Standard (D-S) Extruder A 2.5 inch diameter double-flighted Maddock screw is used to extrude the polymer resins. The geometry of the D-S extruder is: The length-to-diameter (L/D) ratio of the screw is 26 (measured from the beginning of the screw flight to the screw tip) or 24 (measured from the screw location corresponding to the end of the feed casing to the screw tip). The screw is built with 5 basic sections. The 5 basic sections are as follows: (1) a 5.6 diameter long constant depth feed section with a depth of 0.500 inch (12.7 mm), (2) a 4.2 diameter transition section, (3) an 11.8 diameter long first metering section with a constant channel depth of 0.150 inch (3.81 mm), (4) an axial Maddock mixer (2.2 diameters in length), and (5) a second metering channel with a length of 2.5 diameters and a depth of 0.166 inch (4.216 mm). The lead lengths in the feed section, transition, and first metering section are 3.5 inch (88.9 mm). The lead length in the second metering section is 2.3 inch (58.42 mm). The first 2.8 diameters of the feed section, the last 1.4 diameters of the first metering section, and the second metering section are single-flighted. All other sections of the screw are double flighted. The flight width of the single-flighted regions is 0.25 inch (6.35 mm) and the width of the flights in the double-flighted sections is 0.12 inch (3.048 mm).

Extrusion evaluation of the polymers or blends is conducted on the 2.5-inch extruder using the double-flighted Maddock screw and 20/40/60/20 mesh screens (at set temperatures of 115.6° C. across all five zones, head and the die). The screw speeds range from 25 rpm to 100 rpm. Melt discharge temperature is measured by immersing the probe of a hand-held thermocouple (pyrometer) in the molten polymer as it exits the die. This parameter is a measure of the extent of shear-heating prevalent.

The performance of the DFDA-1216 NT resin using the double-flighted Maddock screw is reported in Table 1. As shown in this table, the discharge pressure and discharge temperature increased with increasing screw speed as expected. The specific rate for operation ranged from 0.76 to 0.88 kg per hour at a given revolutions per minute (kg/(h rpm)), indicating that a positive axial pressure gradient exists in the metering channels of the screw. The calculated specific rotational rate is 1 kg/(h rpm).

TABLE 1

Experimental Performance of the Double-flighted Maddock Screw with DFDA-1216 NT LDPE Resin on D-S Extruder

| Performance Feature | 25 rpm | 50 rpm | 75 rpm | 100 rpm |
|---|---|---|---|---|
| Rate, kg/h | 19.1 | 39.5 | 63.1 | 88.5 |
| Specific rate, kg/(h rpm) | 0.76 | 1.74 | 1.86 | 0.88 |
| Pressure (zone 5), MPa | 8.4 | 10.3 | 12.8 | 15.2 |
| Discharge pressure (breaker plate), MPa | 8.6 | 10.7 | 12.1 | 13.1 |
| Pressure (head), MPa | 4.6 | 5.5 | 6.2 | 6.6 |
| Discharge temperature, ° C. | 123.9 | 133.9 | 140.0 | 147.8 |
| Barrel temperature settings, ° C. | 115.6 for 5 zones | 115.6 for 5 zones | 115.6 for 5 zones | 115.6 for 5 zones |
| Motor current, % of full load | 8 | 20 | 34 | 49 |
| Specific energy, J/g | 141 | 340 | 542 | 743 |

Similar process data are collected for the ENGAGE-PP blend at essentially identical conditions. The performance of the double-flighted screw with this resin system is provided in Table 2. The average shear rate calculated in the double-flighted metering channel ranges from about 22 to 87 l/s at screw speeds between 25 and 100 rpm. As shown by FIG. 5, the ENGAGE-PP blend is considerably more viscous than the DFDA-1216 NT resin. At all screw speeds, the measured extrudate temperature for the ENGAGE-PP blend is higher than that measured for the DFDA-1216 NT resin, and at screw speeds higher than 25 rpm the extrudate temperature with the former exceeds the maximum acceptable temperature of 135° C. (275° F.) that is required to minimize any crosslinking during extrusion of peroxide-containing compositions. This double-flighted Maddock screw is thus unacceptable for extruding the ENGAGE-PP blend.

TABLE 2

Experimental Performance of the Double-flighted Maddock Screw for the ENGAGE-PP Blend on D-S Extruder

| Performance Feature | 25 rpm | 50 rpm | 75 rpm | 100 rpm |
|---|---|---|---|---|
| Rate, kg/h | 23.3 | 44.6 | 69.7 | 100.0 |
| Specific rate, kg/(h rpm) | 0.93 | 0.89 | 0.93 | 1.00 |
| Pressure (zone 5), MPa | 24.1 | 26.2 | 23.8 | 21.4 |
| Discharge pressure (breaker plate), MPa | 21.0 | 22.4 | 20.0 | 15.4 |
| Pressure (head), MPa | 8.2 | 8.6 | 7.4 | 10.8 |
| Discharge temperature, ° C. | 135.6 | 161.1 | 177.8 | 187.8 |
| Barrel temperature settings, ° C. | 115.6 for 5 zones | 115.6 for 5 zones | 115.6 for 5 zones | 115.6 for 5 zones |
| Motor current, % of full load | 16 | 38 | 60 | 80 |
| Specific energy, J/g | 230 | 571 | 866 | 1070 |

Example 2 (Comparative Example): Performance Data for Energy Transfer Screw on AK Extruder A comparative energy transfer (ET) screw is used for an American Kuhne (AK) single-screw extruder. The extruder is a 2.5 inch (63.5 mm) diameter machine with a 21 length-to-diameter ratio (measured from the beginning of the screw flight to the screw tip). The ET screw with a deep metering channel is used for this study. The screw has the following sections: (1) an 8 diameter long feed section at a constant depth of 0.515 inch (13.081 mm), (2) a 6 diameter long transition section, (3) a 7 diameter long ET section with a distance averaged depth of 0.207 inch (5.258 mm), and (4) 0.46 diameter long metering section at constant depth of 0.150 inch (3.81 mm). The lead length was 3 inches (76.2 mm) for all sections of the screw.

The performance data for DFDA-1216 NT LDPE resin and ENGAGE-PP blend with the comparative ET screw are listed in Table 3.

TABLE 3

Experimental Performance of the comparative ET Screw for the DFDA-1216 NT LDPE Resin and ENGAGE-PP Blend on AK Extruder

| Resin Type | DFDA-1216 NT LDPE Resin | | | ENGAGE-PP Resin |
|---|---|---|---|---|
| Screw speed, rpm | 25 | 70 | 100 | 25 |
| Rate, kg/h | 24.5 | 78.5 | 112.5 | 35.6 |
| Specific rate, kg/(h rpm) | 0.98 | 1.12 | 1.12 | 1.42 |
| Discharge pressure, MPa | 8.5 | 12.7 | 13.9 | 19.0 |
| Discharge temperature, ° C. | 123 | n/a | n/a | 136 |

TABLE 3-continued

Experimental Performance of the comparative ET Screw for the DFDA-1216 NT LDPE Resin and ENGAGE-PP Blend on AK Extruder

| Resin Type | DFDA-1216 NT LDPE Resin | | | ENGAGE-PP Resin |
|---|---|---|---|---|
| Motor current, % of full load | 31 | 45 | 48 | 55 |
| Specific energy, J/g | 444 | 566 | 599 | 542 |

Example 3: Performance Data for an Energy Transfer Screw of the Present Invention on D-S Extruder One embodiment of the Energy Transfer (ET) screw of the present invention designed for D-S Extruder has a distance averaged ET section depth of 0.22 inch (5.588 mm) and a metering channel depth of 0.16 inch (4.064 mm). A summary of the screw dimensions for the ET screw is provided in Table 4.

TABLE 4

Channel Dimensions for the 2.5 inch (63.5 mm) Diameter ET Screw on D-S Extruder

| Section | ET Design |
|---|---|
| Overall flighted length, mm | 1651 |
| Overall flighted length, diameters | 26 |
| Lead length, mm | 76.2 |
| Flight clearance, mm | 0.0762 |
| Feed Section | |
| Axial length, mm | 381 |
| Number of diameters | 6 |
| Channel depth, mm | 13.21 |
| Flight tip width, mm | 6.35 |
| Flight radii, mm | 7.62 |
| Transition Section | |
| Axial length, mm | 635 |
| Number of diameters | 10 |
| Flight tip width, mm | 6.35 |
| Flight radii, mm | Taper 7.62 to 4.06 |
| Compression rate | 0.0051 |
| ET Section | |
| Axial length, mm | 508 |
| Number of diameters | 8 |
| Entrance depth, mm | 4.06 |
| Exit depth, mm | 4.06 |
| Peak clearance, mm | 1.73 |

TABLE 4-continued

Channel Dimensions for the 2.5 inch (63.5 mm) Diameter ET Screw on D-S Extruder

| Section | ET Design |
|---|---|
| Valley depth, MM | 8.13 |
| Number of peaks | 3 |
| Peak-to-valley axial distance, mm | 95.25 |
| Flight tip width, mm | 5.08 |
| Flight radii, mm | Equal to the local depth |
| Distance average ET section depth*, mm | 5.59 |
| Specific rotational rate, kg/(h rpm) | 1.33 |
| Flighted Meter Section | |
| Axial length, mm | 127 |
| Number of diameters | 2 |
| Metering section depth**, mm | 4.06 |
| Flight tip width, mm | 6.35 |
| Flight radii, mm | 4.04 |
| Compression ratio | 2.4 |

*8.8% of the internal diameter of the extruder barrel, the calculation of which is shown below.
**6.4% of the internal diameter of the extruder barrel.

Figure 6:
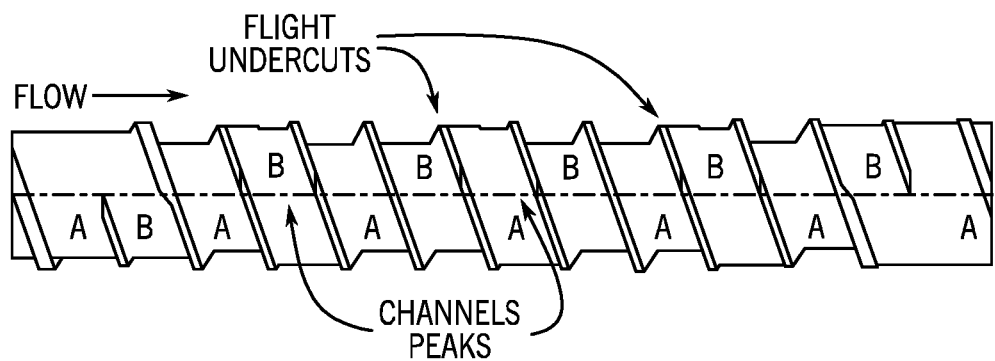
FIG. 6 is a graph reporting a comparison of the performance of ET screw of the present invention and double-flighted Maddock screw for DFDA-1216 NT LDPE resin.

FIG. 6 is a partial schematic drawing of the ET screw described in Table 4. The ET section has two channels, A and B. From the beginning of the ET section to the end, the depths of channel A are represented as $D_{A1}$, $D_{A2}$, $D_{A3}$, $D_{A4}$, $D_{A5}$, $D_{A6}$, and $D_{A7}$, while the lengths of channel A are represented as $L_{A1}$, $L_{A2}$, $L_{A3}$, $L_{A4}$, $L_{A5}$, and $L_{A6}$. For channel B, there are 6 depth ($D_{B1}$, $D_{B2}$, $D_{B3}$, $D_{B4}$, $D_{B5}$, and $D_{B6}$) and 5 ($L_{B1}$, $L_{B2}$, $L_{B3}$, $L_{B4}$, and $L_{B5}$). See Table 5A, Table 5B, and FIG. 6.

TABLE 5A

Lengths and Depths for Channel A

| | Lengths | Depths |
|---|---|---|
| Starting Location Channel A | — | $D_{A1}$ |
| Entry-to-Valley Length | $L_{A1}$ | $D_{A2}$ |
| Valley-to-Valley Length | $L_{A2}$ | $D_{A3}$ |
| Valley-to-Peak Length | $L_{A3}$ | $D_{A4}$ |
| Peak-to-Valley Length | $L_{A4}$ | $D_{A5}$ |
| Valley -to-Valley Length | $L_{A5}$ | $D_{A6}$ |
| Valley-to-Exit Length | $L_{A6}$ | $D_{A7}$ |

TABLE 5B

Lengths and Depths for Channel B

| | Lengths | Depths |
|---|---|---|
| Starting Location Channel B | — | $D_{B1}$ |
| Entry-to-Peak Length | $L_{B1}$ | $D_{B2}$ |
| Peak-to-Valley Length | $L_{B2}$ | $D_{B3}$ |
| Valley -to-Valley Length | $L_{B3}$ | $D_{B4}$ |
| Valley-to-Peak Length | $L_{B4}$ | $D_{B5}$ |
| Peak-to-Exit Length | $L_{B5}$ | $D_{B6}$ |

The total length of Channel A:

$$L_A = L_{A1} + L_{A2} + L_{A3} + L_{A4} + L_{A5} + L_{A6}$$

The depth-length of Channel A:

$$D_A \cdot L_A = L_{A1} \times \frac{D_{A1} + D_{A2}}{2} + L_{A2} \times \frac{D_{A2} + D_{A3}}{2} + L_{A3} \times \frac{D_{A3} + D_{A4}}{2} + L_{A4} \times \frac{D_{A4} + D_{A5}}{2} + L_{A5} \times \frac{D_{A5} + D_{A6}}{2} + L_{A6} \times \frac{D_{A6} + D_{A7}}{2}$$

Similarly, the total length of Channel B:

$$L_B = L_{B1} + L_{B2} + L_{B3} + L_{B4} + L_{B5} + L_{B6}$$

The depth-length of Channel B:

$$D_B \cdot L_B = L_{B1} \times \frac{D_{B1} + D_{B2}}{2} + L_{B2} \times \frac{D_{B2} + D_{B3}}{2} + L_{B3} \times \frac{D_{B3} + D_{B4}}{2} + L_{B4} \times \frac{D_{B4} + D_{B5}}{2} + L_{B5} \times \frac{D_{B5} + D_{B6}}{2}$$

The distance average ET depth is calculated as follows:

$$D_{average} = \frac{D_A \cdot L_A + D_B \cdot L_B}{L_A + L_B}$$

The lengths and depths for the ET screw of Table 4 are listed in Table 6A and Table 6B.

TABLE 6A

Lengths and Depths for Channel A in ET screw of Table 4

| | Lengths, mm | Depths, mm |
|---|---|---|
| Starting Location Channel A | | 4.06 |
| Entry-to-Valley Length | 95.25 | 8.13 |
| Valley-to-Valley Length | 76.2 | 8.13 |
| Valley-to-Peak Length | 95.25 | 1.73 |
| Peak-to-Valley Length | 95.25 | 8.13 |
| Valley -to-Valley Length | 76.2 | 8.13 |
| Valley-to-Exit Length | 60.45 | 4.06 |

TABLE 6B

Lengths and Depths for Channel B in ET screw of Table 4

| | Lengths, inch | Depths, inch |
|---|---|---|
| Starting Location Channel B | | 4.06 |
| Entry-to-Peak Length | 95.25 | 1.73 |
| Peak-to-Valley Length | 95.25 | 8.13 |

TABLE 6B-continued

Lengths and Depths for Channel B in ET screw of Table 4

| | Lengths, inch | Depths, inch |
|---|---|---|
| Valley-to-Valley Length | 76.2 | 8.13 |
| Valley-to-Peak Length | 95.25 | 1.73 |
| Peak-to-Exit Length | 60.45 | 4.06 |

The total length of Channel A for ET screw of Table 4 is 498.6 mm by the following equation:

$$L_A = 95.25 + 76.2 + 95.25 + 95.25 + 76.2 + 60.45$$

The depth-length of Channel A for ET screw of Table 4 is 123.09 mm² by the following equation:

$$D_A \cdot L_A = 95.25 \times \frac{4.06+8.13}{2} + 76.2 \times \frac{8.13+8.13}{2} + 95.25 \times \frac{8.13+1.73}{2} + 95.25 \times \frac{1.73+8.13}{2} + 76.2 \times \frac{8.13+8.13}{2} + 60.45 \times \frac{8.13+4.06}{2}$$

The total length of Channel B for ET screw of Table 4 is 422.4 mm by the following equation:

$$L_B = 95.25 + 95.25 + 76.2 + 95.25 + 60.45$$

The depth-length of Channel B for ET screw of Table 4 is 79.09 mm² by the following equation:

$$D_B \cdot L_B = 95.25 \times \frac{4.06+1.73}{2} + 95.25 \times \frac{1.73+8.13}{2} + 76.2 \times \frac{8.13+8.13}{2} + 95.25 \times \frac{8.13+1.73}{2} + 60.45 \times \frac{1.73+4.06}{2}$$

The distance average ET depth is calculated to be 5.58 mm by:

$$D_{average} = \frac{D_A \cdot L_A + D_B \cdot L_B}{L_A + L_B} = \frac{123.09 + 79.09}{498.6 + 422.4}$$

So: 5.58±63.5*100%=8.8%

The performance of the ET screw for DFDA-1216 NT LDPE resin, ENGAGE-PP blend and POE1-PP blend are determined in the laboratory.

Extrusion evaluation of the polymers or blends is conducted using the 2.5-inch extruder using the ET screw of Table 4 and 20/40/60/20 mesh screens (at set temperatures of 115.6° C. across all five zones, head and the die). The screw speeds range from 25 rpm to 100 rpm. Melt discharge temperature is measured by immersing the probe of a hand-held thermocouple (pyrometer) in the molten polymer as it exits the die. This parameter is a measure of the extent of shear-heating prevalent.

The performance data for DFDA-1216 NT LDPE resin with the ET screw of Table 4 on D-S Extruder are listed in Table 7. The specific rate for DFDA-1216 NT LDPE resin is in the range of 0.92 to 1.03 kg/(h rpm). The discharge temperature is below target of 135° C. (required to minimize any crosslinking during extrusion of peroxide-containing compositions) when screw speed is not higher than 50 rpm. Also, the discharge pressures for all screw speeds are below the target of 3,500 psi (24.1 MPa).

TABLE 7

Experimental Performance of the ET Screw of Table 4 for DFDA-1216 NT LDPE Resin on D-S Extruder

| Performance Feature | 25 rpm | 50 rpm | 75 rpm | 100 rpm |
|---|---|---|---|---|
| Rate, kg/h | 23.0 | 49.5 | 77.3 | 102.6 |
| Specific rate, kg/(h rpm) | 0.92 | 0.99 | 1.03 | 1.03 |
| Pressure (zone 5), MPa | 9.3 | 12.4 | 15.2 | 17.9 |
| Discharge pressure (breaker plate), MPa | 10.7 | 13.8 | 15.9 | 19.3 |
| Pressure (head), MPa | 5.0 | 6.2 | 7.0 | 7.5 |
| Discharge temperature, ° C. | 123.9 | 131.7 | 137.8 | 143.3 |
| Barrel temperature settings, ° C. | 115.6 for 5 zones | 115.6 for 5 zones | 115.6 for 5 zones | 115.6 for 5 zones |
| Motor current, % of full load | 9 | 23 | 40 | 55 |
| Specific energy, J/g | 131 | 311 | 521 | 719 |

The performance data of the ET screw of Table 4 for ENGAGE-PP and POE1-PP blends on D-S Extruder are listed in Tables 8 and 9, respectively. The specific rate for ENGAGE-PP and POE1-PP blends, in the range of 1.17 to 1.36 kg/(h rpm), is higher than that for DFDA-1216 NT LDPE resin (Table 7). Both the discharge temperature and discharge pressure are below the targets (135° C. and 24.1 MPa) when screw speed is not higher than 25 rpm, while they exceeded the targets when screw speed is higher than 25 rpm.

For both ENGAGE-PP and POE1-PP blends, the zone 5 pressure is higher than the discharge pressure at the four screw speeds, which indicates that the pressure gradient is negative; therefore, the metering zone is full of resin and the pressure is facilitating the rate (e.g., pressure flow increases).

TABLE 8

Experimental Performance of the ET Screw of
Table 4 for ENGAGE-PP Blend on D-S Extruder

| Performance Feature | 25 rpm | 50 rpm | 75 rpm | 100 rpm |
|---|---|---|---|---|
| Rate, kg/h | 29.9 | 61.0 | 95.8 | 135.8 |
| Specific rate, kg/(h rpm) | 1.20 | 1.22 | 1.28 | 1.36 |
| Pressure (zone 5), MPa | 32.1 | 38.6 | 41.7 | 39.3 |
| Discharge pressure (breaker plate), MPa | 24.1 | 26.9 | 26.4 | 25.5 |
| Pressure (head), MPa | 9.7 | 10.9 | 9.9 | 10.1 |
| Discharge temperature, C. | 134.4 | 158.3 | 173.3 | 185.0 |
| Barrel temperature settings, ° C. | 115.6 for 5 zones | 115.6 for 5 zones | 115.6 for 5 zones | 115.6 for 5 zones |
| Motor current, % of full load | 15 | 39 | 63 | n/a |
| Specific energy, J/g | 168 | 429 | 662 | n/a |

TABLE 9

Experimental Performance of the ET screw of
Table 4 for POE1-PP Blend on D-S Extruder

| Performance Feature | 25 rpm | 50 rpm | 75 rpm | 100 rpm |
|---|---|---|---|---|
| Rate, kg/h | 29.4 | 59.9 | 92.8 | 129.0 |
| Specific rate, kg/(h rpm) | 1.17 | 1.20 | 1.24 | 1.29 |
| Pressure (zone 5), MPa | 27.6 | 34.5 | 37.6 | 37.6 |
| Discharge pressure (breaker plate), MPa | 20.7 | 24.1 | 25.2 | 25.5 |
| Pressure (head), MPa | 8.8 | 10.1 | 10.1 | 9.2 |
| Discharge temperature, ° C. | 130.6 | 154.4 | 168.9 | 179.4 |
| Barrel temperature settings, ° C. | 115.6 for 5 zones | 115.6 for 5 zones | 115.6 for 5 zones | 115.6 for 5 zones |
| Motor current, % of full load | 14 | 34 | 57 | 80 |
| Specific energy, J/g | 156 | 381 | 618 | 832 |

Comparison 1: Performance Data for Double Flighted Maddock Screw and Energy Transfer Screw on D-S Extruder Comparative data from two separate extrusion runs of the exact same batch of the DFDA-1216 NT LDPE resin, on the 2.5 inch Davis Standard extruder using the double-flighted Maddock screw of Example 1 (Comparative Example), are given in Tables 1 and 10. The averages of the two sets of data are shown in Table 11.

TABLE 10

Experimental Performance of the Double-flighted Maddock
Screw with DFDA-1216 NT LDPE Resin on D-S Extruder

| Performance Feature | 25 rpm | 50 rpm | 75 rpm | 100 rpm |
|---|---|---|---|---|
| Rate, kg/h | 19.5 | 39.7 | 62.3 | 89.8 |
| Specific rate, kg/(h rpm) | 0.78 | 0.79 | 0.83 | 0.90 |
| Pressure (zone 5), MPa | 8.4 | 10.2 | 12.4 | 14.5 |
| Discharge pressure (breaker plate), MPa | 9.1 | 10.5 | 11.7 | 12.8 |
| Pressure (head), MPa | 4.8 | 5.7 | 6.2 | 6.6 |
| Discharge temperature, ° C. | 119.4 | 130.6 | 137.8 | 144.4 |
| Barrel temperature settings, ° C. | 115.6 for 5 zones | 115.6 for 5 zones | 115.6 for 5 zones | 115.6 for 5 zones |
| Motor current, % of full load | 8 | 20 | 35 | 51 |
| Specific energy, J/g | 138 | 338 | 542 | 743 |

TABLE 11

Experimental Performance of the Double-flighted Maddock Screw with DFDA-1216 NT LDPE Resin on D-S Extruder

| Performance Feature | 25 rpm | 50 rpm | 75 rpm | 100 rpm |
|---|---|---|---|---|
| Rate, kg/h | 19.3 | 39.6 | 62.7 | 89.1 |
| Specific rate, kg/(h rpm) | 0.77 | 0.79 | 0.84 | 0.89 |
| Pressure (zone 5), MPa | 8.4 | 10.3 | 12.6 | 14.8 |
| Discharge pressure (breaker plate), MPa | 8.9 | 10.6 | 11.9 | 12.9 |
| Pressure (head), MPa | 4.7 | 5.6 | 6.2 | 6.6 |
| Discharge temperature, °C. | 121.7 | 132.2 | 138.9 | 146.1 |
| Barrel temperature settings, °C. | 115.6 for 5 zones | 115.6 for 5 zones | 115.6 for 5 zones | 115.6 for 5 zones |
| Motor current, % of full load | 8 | 20 | 35 | 50 |
| Specific energy, J/g | 139 | 339 | 561 | 753 |

Figure 7:
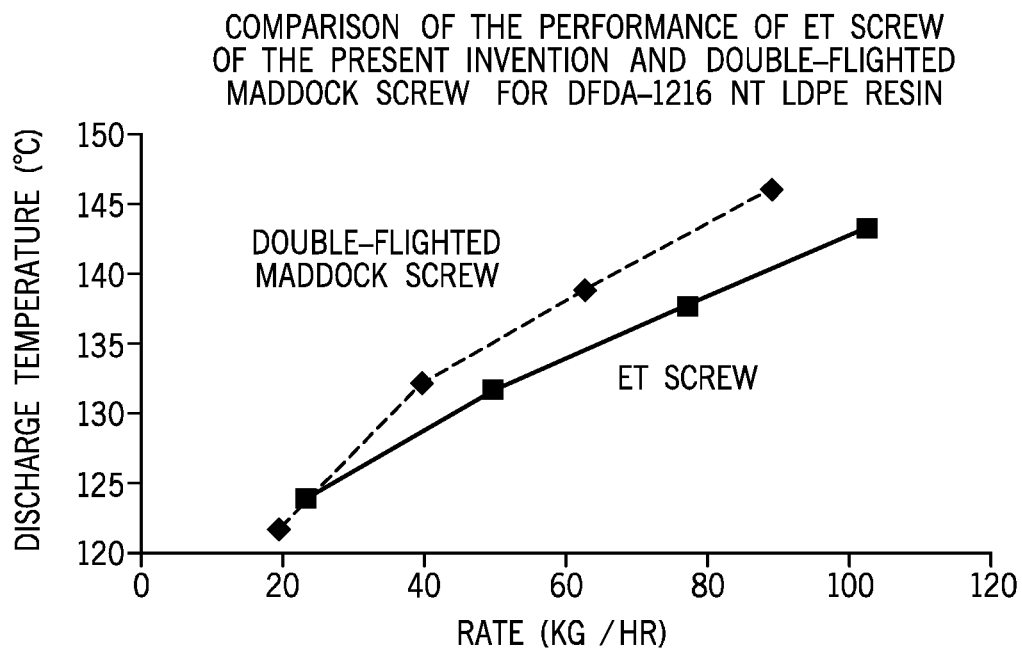
FIG. 7 is a graph reporting a comparison of the performance of ET screw of the present invention (red square) and the double-flighted Maddock screw (blue diamond) for ENGAGE-PP blend and the performance of ET screw of the present invention for POE1-PP blend (green triangle).

FIG. 7 (blue diamond is double-flighted Maddock screw, and red square is ET screw) shows the comparison of the performance of the ET screw of this invention and double-flighted Maddock screw for DFDA-1216 NT LDPE resin (using the values in Table 9 for the double-flighted Maddock screw and those in Table 7 for the ET screw of this invention). At the same rate, the discharge temperature of the extrudate on the ET screw was always a few degrees lower than that on the double-flighted Maddock screw. Also, the rate of the ET screw was higher than that of the double-flighted Maddock screw. The rate was improved from 32% to 33% in the temperature range of 135° C. to 145° C. The improvement of the rate is computed by fitting the data in FIG. 7 with quadratic equations and using these equations to deduce the rate at any given temperature. Therefore, the ET screw provides a significant rate improvement compared with the double-flighted Maddock screw. Another perspective is that, at a fixed rate of 90.7 kg/hr, the ET screw resulted in 6° C. lower melt discharge temperature than the double-flighted Maddock screw (which is beneficial for minimizing any crosslinking during extrusion of peroxide-containing compositions).

Figure 8:
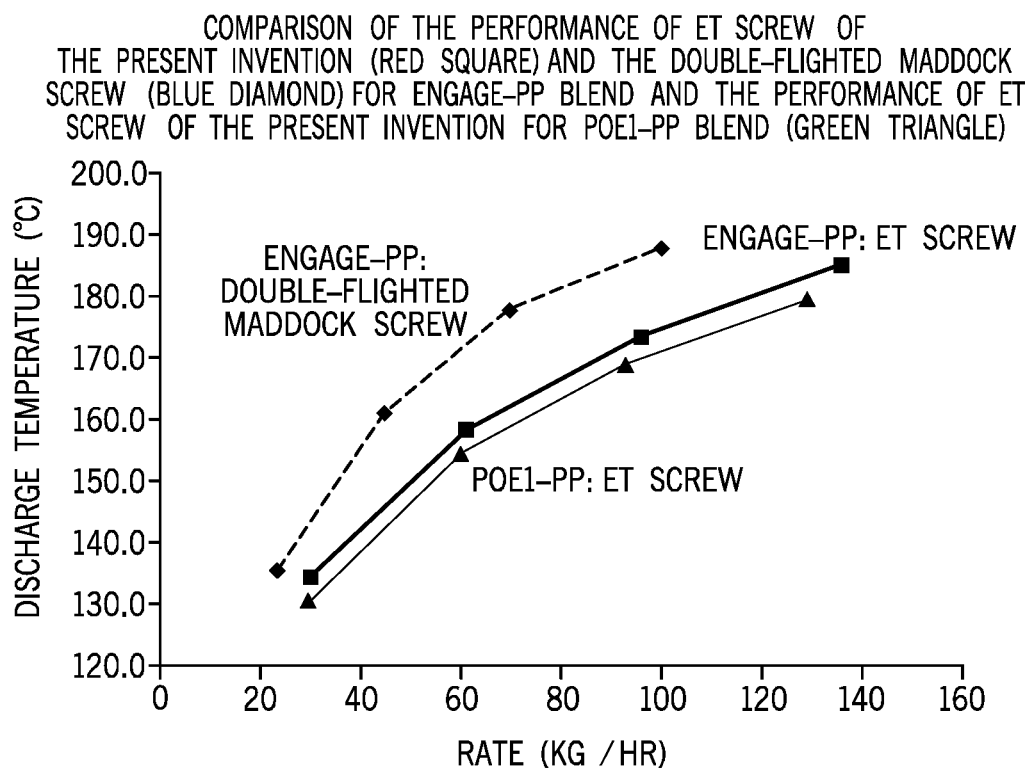
FIG. 8 is a graph reporting a comparison of ET screw of the present invention (red square) and the double-flighted Maddock screw (blue diamond) for ENGAGE-PP blend and the performance of ET screw of the present invention for POE1-PP blend (green triangle).

FIG. 8 (blue diamond is ENGAGE-PP: double-flighted Maddock screw; red square is ENGAGE-PP: ET screw; and green triangle is POE1-PP: ET screw) shows the comparison of the performance on the ET screw of the present invention and double-flighted Maddock screw for ENGAGE-PP resin (using the values in Table 2 for the double-flighted Maddock screw and those in Table 8 for the ET screw of this invention). Similar to DFDA-1216 NT LDPE resin, the discharge temperature of the extrudate on the ET screw is always a few degrees lower than that on the double-flighted Maddock screw at the same rate. Also, the rate of the ET screw is higher than that of the double-flighted Maddock screw. The rate is improved from 31% to 49% in the temperature range of 135° C. to 145° C. The improvement of the rate is computed by fitting the data in FIG. 7 with quadratic equations and using these equations to deduce the rate at any given temperature. Therefore, the ET screw provides significant rate improvement compared with the double-flighted Maddock screw for ENGAGE-PP blend. Another way to interpret the data is that, at a given throughput of 31.8 kg/h, the ET screw resulted in 10° C. reduction in melt discharge temperature compared with the double-flighted Maddock screw. As in the case of LDPE, this would be advantageous for minimizing premature decomposition of peroxide in the compositions during the extrusion step.

The performance curve of rate versus discharge temperature for POE1-PP blend using the ET screw of this invention is also presented in FIG. 8 (using the data given in Table 9).

The performance curves for POE1-PP and ENGAGE-PP blends on the ET screw of the present invention have similar trends, which can be attributed to the fact that the two blends have very similar melt rheologies. The slight difference results from the variability between different compounding processes and different lots of resins.

The performance of the ET screw of the present invention is studied for a variety of resins and resin blends, and the performance data are compared with the performance data of the double-flighted Maddock screw. The results are summarized in Table 12. For all the resins or resin blends, the rate of the ET screw is higher than that of the double-flighted Maddock screw. The rate improvement is significant, from 7% to as high as 80% in the temperature range of 135° C. to 145° C. The improvement of the rate is computed by fitting the data on melt discharge temperature (° C.) versus extrusion rate (kg/hr) with either linear or quadratic equations (whichever gives a better fit) and using these equations to deduce the rate at any given temperature.

TABLE 12

Rate Improvement of the ET Screw of Table 4 Relative to the Double-flighted Maddock Screw for a Variety of Resins and Resin Blends on D-S Extruder

| Resin | % Rate Improvement (Relative to double-flighted Maddock Screw) |
|---|---|
| DFDA-1216 NT LDPE | 32-33 |
| 80 wt % POE2<br>20 wt % LDPE 662I | 21-26 |
| 65 wt % POE1<br>35 wt % LDPE 662I | 2-16 |
| 91 wt % ENGAGE ™ 8200<br>9 wt % Braskem FF018F PP | 31-49 |
| NORDEL ™ 3722 EL | <7 |
| High LCB EO Elastomer | 18-20 |
| High LCB EP Elastomer | 36-80 |

Comparison 2: Performance Data for Energy Transfer Screws on AK Extruder and D-S Extruder Comparing the performance data for DFDA-1216 NT LDPE resin of ET screw on AK extruder (Table 3) with those of ET screw of the present invention on D-S extruder (Table 7), the discharge temperature of the ET screw on AK extruder is slightly lower than that of the ET screw of the present invention on D-S Extruder at screw speed of 25 rpm; however, at screw speeds higher than 25 rpm (e.g., 70 rpm and 100 rpm), unmelt resins are observed on the AK extruder and it is impossible to measure accurate discharge temperature.

For the performance of ENGAGE-PP blend, the discharge temperature at 25 rpm of the comparative ET screw on AK Extruder is 136° C., while that of the ET screw of the present invention at 25 rpm on D-S Extruder is 134.4° C. Furthermore, at higher screw speed (up to 100 rpm), unmelt resins are observed with the comparative ET screw used on AK extruder, but not with the ET screw of present invention used on D-S Extruder. The results showed that the ET screw of the present invention on D-S Extruder is not only able to keep the discharge temperature below the target of 135° C. (that is required to minimize any crosslinking during extrusion of peroxide-containing compositions), but is also effective at preventing unmelts, while the comparative ET screw on AK Extruder does not have such a good performance.

Comparison 3: Simulated Performance Data for Energy Transfer Screws on D-S Extruder at Different ET Average Depths and Metering Section Depths Simulations are conducted for the ENGAGE-PP blend using the ET screws of the present invention on D-S Extruder at different ET average depths and metering section depths. As shown in Table 13, the rate increases as the ET average depth and metering section depth increase while the discharge temperature is maintained at 135° C. The first design is selected for the final screw fabrication (i.e., ET screw of Table 4) because unmelted resins are very likely to be present in the extrudates if the ET average depth and metering section depth go too deep.

TABLE 13

Simulated Performance of the ET Screws of this Invention for ENGAGE-PP Blend on D-S Extruder

| Screw Design | Channel Depth | | Screw Speed rpm | Rate kg/h | Specific Rate kg/(h rpm) | P MPa | T ° C. |
|---|---|---|---|---|---|---|---|
| | ET, mm | Meter, mm | | | | | |
| Design 1 | 5.588 | 4.064 | 45 | 54.0 | 1.00 | 20.4 | 135 |
| Design 2 | 5.842 | 4.064 | 45 | 46.0 | 1.02 | 19.7 | 135 |
| Design 3 | 5.842 | 4.318 | 47 | 48.7 | 1.03 | 20.6 | 135 |

What is claimed is:

1. An energy transfer (ET) screw for a single screw extruder, the extruder comprising an extruder barrel with an inside diameter, the screw comprising:
   (1) an ET section with a distance averaged ET section depth of 8.0% to 10% of the extruder barrel internal diameter, and
   (2) a metering section with a metering section depth of 6.0% to 8% of the extruder barrel internal diameter.

2. The ET screw of claim 1 further comprising a plurality of barrier clearances that are the same throughout the length of the energy transfer section.

3. The ET screw of claim 1 further comprising a plurality of barrier clearances that reduce throughout the length of the energy transfer section.

4. A process of melting and extruding a crosslinkable composition in a single screw extruder, the extruder comprising an energy transfer (ET) screw and a barrel with an inside diameter, the screw rotatably mounted within the barrel, the process comprising the steps of:
   (A) feeding a meltable, solid crosslinkable composition to the extruder;
   (B) rotating the screw within the extruder barrel; and
   (C) melting the solid crosslinkable composition within the extruder and moving the composition through the extruder by the rotation of the screw; the screw comprising:
   (1) an ET section with a distance averaged ET section depth of 8.0% to 10% of the extruder barrel internal diameter, and
   (2) a metering section with a metering section depth of 6.0% to 8% of the extruder barrel internal diameter.

5. The process of claim 4 in which the composition comprises a polyolefin.

6. The process of claim 4 in which the composition comprises an ethylene-based polyolefin.

7. The process of claim 4 [any of claims 4-6] in which the composition further comprises a free radical initiator.

8. The process of claim 7 in which the free radical initiator is a peroxide.

* * * * *